(12) United States Patent
Miyashita (10) Patent No.: US 6,912,910 B2
(45) Date of Patent: Jul. 5, 2005

(54) CAPACITIVE PRESSURE SENSOR

(75) Inventor: Haruzo Miyashita, Fujiyoshida (JP)

(73) Assignee: Anelva Corporation, Fuchu (JP)

( * ) Notice: Subject to any disclaimer, the term of this patent is extended or adjusted under 35 U.S.C. 154(b) by 17 days.

(21) Appl. No.: 10/739,129

(22) Filed: Dec. 19, 2003

(65) Prior Publication Data

US 2004/0129947 A1 Jul. 8, 2004

(30) Foreign Application Priority Data

Dec. 19, 2002 (JP) .......................... 2002-368867

(51) Int. Cl.[7] .............................................. G01L 9/12
(52) U.S. Cl. ........................................... 73/718; 73/724
(58) Field of Search ......................... 73/715, 718, 724; 361/283.1, 283.2, 283.3, 283.4

(56) References Cited

U.S. PATENT DOCUMENTS 6,598,483 B2    7/2003  Miyashita et al.
6,647,794 B1 *  11/2003 Nelson et al. ................ 73/718

FOREIGN PATENT DOCUMENTS

JP      08-035899     2/1996
JP      2001-201417   7/2001

* cited by examiner

*Primary Examiner*—Hoai Pham
(74) *Attorney, Agent, or Firm*—Burns, Doane, Swecker & Mathis, L.L.P.

(57) ABSTRACT

A pressure sensor includes a capacitive pressure sensor chip mounted with the intervention of a sealing member on a base adaptor so as to be detachable. The sensor chip being constructed in a manner that a second substrate with a diaphragm electrode is placed between a first substrate with a fixed electrode and a third substrate with a pressure inlet and is bonded to the first and the third substrate so as to overlap the fixed electrode, the diaphragm electrode and the pressure inlet with a prescribed gap between the fixed electrode and the diaphragm electrode. Moreover, the third substrate is larger than the second substrate to make place which extends outside the second substrate and plays a role as a sealing surface to be in contact with the sealing member, and the sealing surface is pressed to the base adaptor with the intervention of the sealing member.

12 Claims, 6 Drawing Sheets

CAPACITIVE PRESSURE SENSOR

CROSS-REFERENCE TO RELATED APPLICATIONS

The present application claims the priority of JP 2002-368867 filed in Japan Dec. 19, 2002, the entire contents of which are incorporated herein by reference.

BACKGROUND OF THE INVENTION

1. Field of the Invention

The present invention relates to a capacitive pressure sensor and, more particularly, to a high accuracy pressure sensor which enables exchange of a multi-structural sensor chip.

2. Description of Related Art

In recent years, the manufacturing techniques of semiconductor devices have been applied to the production of structural components which are essentially sub-millimeter-sized. This technology is called microelectromechanical systems (MEMS) and is widely used to fabricate light and small actuators, sensors and the like in many technical fields. Capacitive pressure sensors can also be produced by MEMS technology, and one example of them is described in JP2001-201417A.

Figure 8:
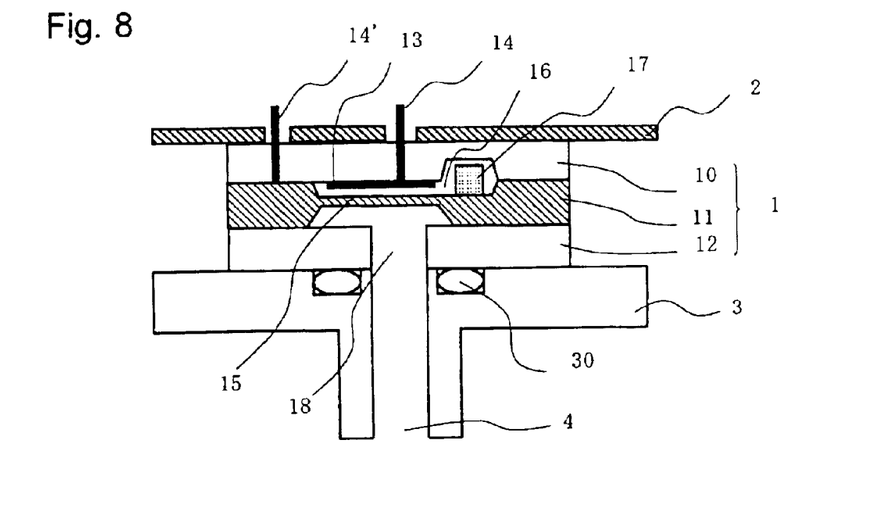
FIG. 8 is a schematic sectional view showing one example of conventional capacitive pressure sensors in which the sensor element can be detachable.
Figure 9:
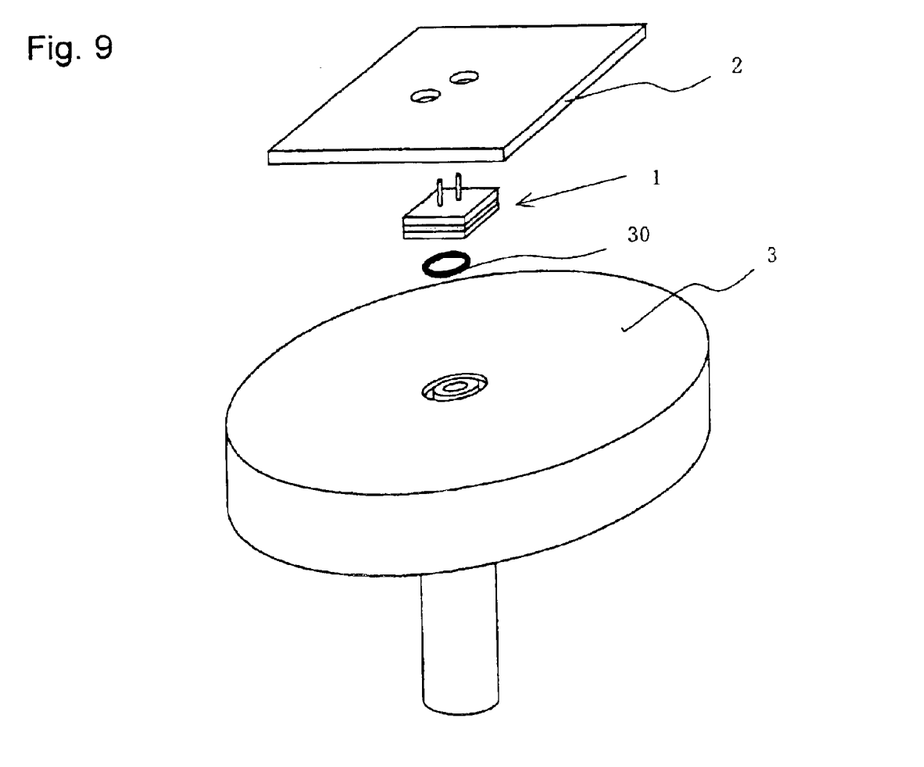
FIG. 9 is a schematic perspective view showing one example of conventional pressure sensors in which the sensor chip is detachable.

A conventional capacitive pressure sensor of which sensor chip is produced by MEMS technology generally has a configuration that the sensor chip is mounted on a base adaptor with an adhesive, and the base adaptor has a pressure inlet to conduct a gas pressure to the sensor chip. Here, the pressure sensor chip is composed of a silicon substrate and a glass substrate, and a diaphragm electrode and a fixed electrode are formed on the silicon substrate and the glass substrate, respectively. These two electrodes face each other in a sealed chamber which is formed by bonding the silicon substrate and the glass substrate. The pressure sensor having such a configuration is however disadvantageous because the base adaptor must be also replaced when the sensor chip is needed to be exchanged, and results in a wasteful use. Then, the present inventor investigated pressure sensors in which a sensor chip is mounted on a base adaptor detachably by use of a sealing member such as an O-ring, because it is th ought that this method enables the replacement of the sensor chip independently. This sensor is explained in detail with reference to FIGS. 8 and 9. FIGS. 8 and 9 are a schematic sectional view and a perspective view of a conventional capacitive pressure sensor, respectively.

Here, a pressure sensor chip 1 is composed of three substrates, that is, a glass substrate 10 with a fixed electrode 13, a silicon substrate 11 with a diaphragm electrode 15 and a glass substrate 12 with a pressure inlet 18. A multi-structure is formed by bonding those three substrates. The fixed electrode 13 and the diaphragm electrode 15 are connected to an electric circuit (not illustrated) through lead wires 14 and 14', respectively.

A sealed chamber 16 is formed between a glass substrate 10 and a silicon substrate 11, and the inside of it is kept at low pressure with the aid of a non-evaporable getter 17 which absorbs residual gas inside the sealed chamber 16. The thickness of the diaphragm 15 of the silicon substrate 11 is usually several microns to dozens of microns. The thickness and the size of this diaphragm are determined according to a pressure range to be measured. The diaphragm deflects in response to the pressure difference between both sides of the diaphragm, and the electrostatic capacitance between the fixed electrode 13 and the diaphragm electrode 15 varies as a function of the degree of the diaphragm deflection. Thus, the pressure of the space to be measured 4 can be obtained from the relation between the electrostatic capacitance and the pressure.

As shown in the drawings, the sensor chip 1 is placed on the base adaptor 3 with the intervention of the O-ring 30, and a press plate 2 fixes the sensor chip 1 with plural screws and the like (not illustrated). The pressure sensor in this configuration is installed to a vacuum chamber and the like, and then is used to measure the actual pressure inside the vacuum chamber after zero point adjustment is carried out by adjusting the trimmer potentiometer of a pressure display unit.

Thus, when the sensor chip 1 is damaged or deteriorated, the sensor chip 1 can be exchanged independently, while the base adaptor 3 and other parts are allowed to be reusable. Consequently, it makes possible to reduce the maintenance cost of the pressure sensor.

SUMMARY

However, it has been found that the pressure sensors shown in FIGS. 8 and 9 have a disadvantage that the measurement accuracy can't be maintained since the measured pressure values change with the condition on which the sensor chip 1 is mounted. That is, in order to secure the vacuum seal, the sensor chip 1 should be pressed to such a degree that the O-ring 30 is deformed by the press plate 2. However, the measured pressure values also change with the uniformity and the magnitude of the force applied to the press plate 2.

As a result of the investigation of this phenomenon, it has been proved that the force applied to the press plate 2 deforms the diaphragm 15 under the influence of the non-uniformity and the magnitude of the force, too. This is caused by the fact that the diaphragm 15 is designed to be thin and easily deflected. The deformation of the diaphragm induces a significant change in the electrostatic capacitance, and hence the errors in the measured pressure are caused. Therefore, in order to produce sensors which can measure accurate pressure, the conditions under which the screws are tightened must be adjusted so that the deviation of capacitance from the designed value should settle within the compensation limits of the electric circuit. However, this operation is very complicated and requires special skills.

Then, further examination based on the above knowledge was carried out on various sensor configurations and the method for mounting a sensor chip in order to avoid the diaphragm deformation. Consequently, pressure sensors which realize reliable measurements have been completed. That is, an object of this invention is to provide a capacitive pressure sensor with a detachable sensor chip, which reduces the variation and the scatter in electrostatic capacitance due to the manner of attachment of the sensor chip. Another object of this invention is to provide a capacitive pressure sensor which realizes reliable measurements even in the case where ambient temperature varies.

In order to attain the above-mentioned objects, embodiments of the capacitive pressure sensors of this invention are constructed as follows. That is, a pressure sensor comprises a capacitive pressure sensor chip mounted on a base adaptor so as to be detachable with the intervention of a sealing member, said sensor chip being constructed in a manner that a second substrate with a diaphragm electrode is placed between a first substrate with a fixed electrode and a third substrate with a pressure inlet and is bonded to said first and said second substrate so as to overlap said fixed electrode, said diaphragm electrode and said pressure inlet with a certain gap, wherein said third substrate is larger than said second substrate to make place which extends outside said second substrate and plays a role as a sealing surface to be in contact with said sealing member, and said sealing surface is pressed to said base adaptor with the intervention of said sealing member. Here, it is preferable to press said place of the third substrate from the surface opposite to said sealing surface by a press plate.

Thus, the sensor chip is fixed by the force which is exerted not onto the entire sensor chip but only onto the third substrate with a pressure inlet, and hence, the diaphragm can be prevented from deformation caused by the attachment of sensor chip. This makes it possible to obtain the capacitance as designed, and moreover stable and accurate measurements over a prescribed pressure range are realized.

In this invention, as the anodic bonding method is preferably employed to bond the substrates, insulating substrates are used for the first substrate with a fixed electrode and the third substrate with a pressure inlet, and conductive substrate is used for the second substrate with a diaphragm electrode. As the materials of insulating substrate and conductive substrate, the combination of Pyrex 7740 (registered trademark of Corning Glass, Corning) glass and silicon, or that of Pyrex 7740 glass and Fe-Ni alloy is preferably used since these materials have almost the same thermal expansion coefficient. The thickness and the size of the diaphragm are determined by the desired pressure range for measurements, and then the size of the second substrate is determined, too. In addition, the third substrate with a pressure inlet is preferably designed to be larger than the second substrate by 3 mm or more outside to form a sealing region. The thickness of the third substrate is usually 1–5 mm.

It is also preferable to employ a guide member to prevent the destruction of the third substrate due to excessive tightening by screws. That is, the gap between the base adaptor and the press plate by which the peripheral region of the third substrate is pressed onto the base adaptor is kept to be larger than a prescribed value. This makes it easy and safe to mount the sensor chip.

In addition, it is preferable to place a buffer member between said press plate and said third substrate. In particular, another same O-ring as being used as the sealing member is also placed as the buffer member at the symmetrical position on the opposite surface of the third substrate. The buffer member reduces the substrate strain due to the difference of thermal expansions and improves the temperature characteristic of electrostatic capacitance to carry out accurate pressure measurements.

The buffer member embodiments of this invention can reduce the strain of the third substrate which is caused by the difference of thermal expansions between the press plate and the third substrate. Therefore, an elastic material such as rubber is preferably employed and even a rigid material may be also employed so long as its friction coefficient is small.

Here, numeral 1 denotes pressure sensor chip, 2; press plate, 3; base adaptor, 4; space to be measured, 10; glass substrate (first substrate), 13; fixed electrode, 14, 14'; lead wire, 15; diaphragm electrode, 16; sealed (vacuum) chamber, 17; non-evaporable getter, 18; pressure inlet, 21; aperture, 30; O-ring, 31; groove, 32; guide member, and 33; buffer member.

DESCRIPTION OF PREFERRED EMBODIMENTS

The embodiments of this invention will be explained below with reference to the drawings in which the construction and the arrangement of members are roughly shown just for understanding the present invention. Moreover, the construction (material), various numerical values and the like described in the explanation are only the examples preferably used for this invention. Therefore, this invention is not limited to the embodiments mentioned below, but can be applied to a variety of forms based on the claims.

(Embodiment 1)

Figure 1:
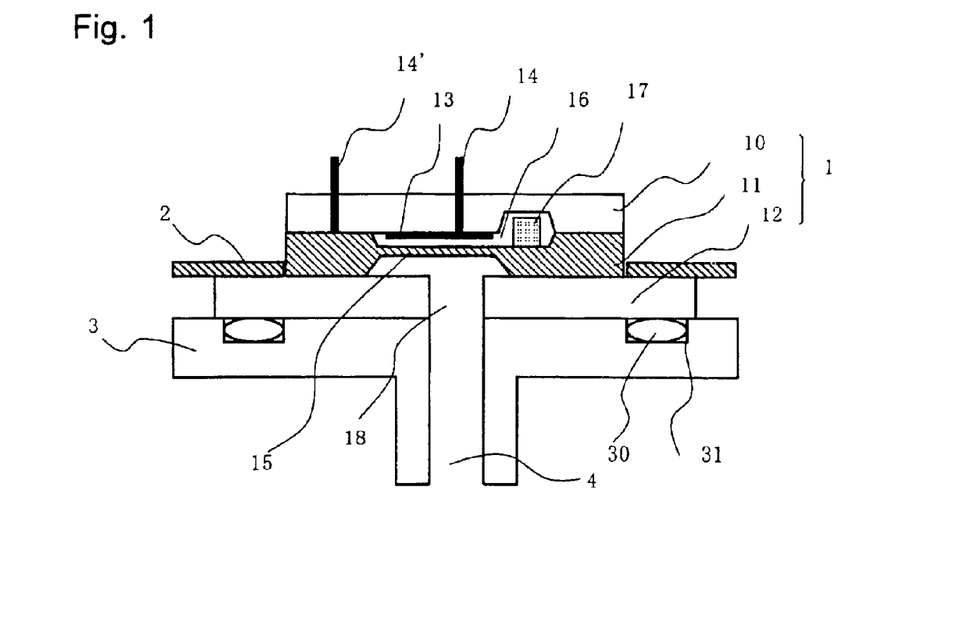
FIG. 1 is a schematic sectional view showing a capacitive pressure sensor of Embodiment 1.
Figure 2:
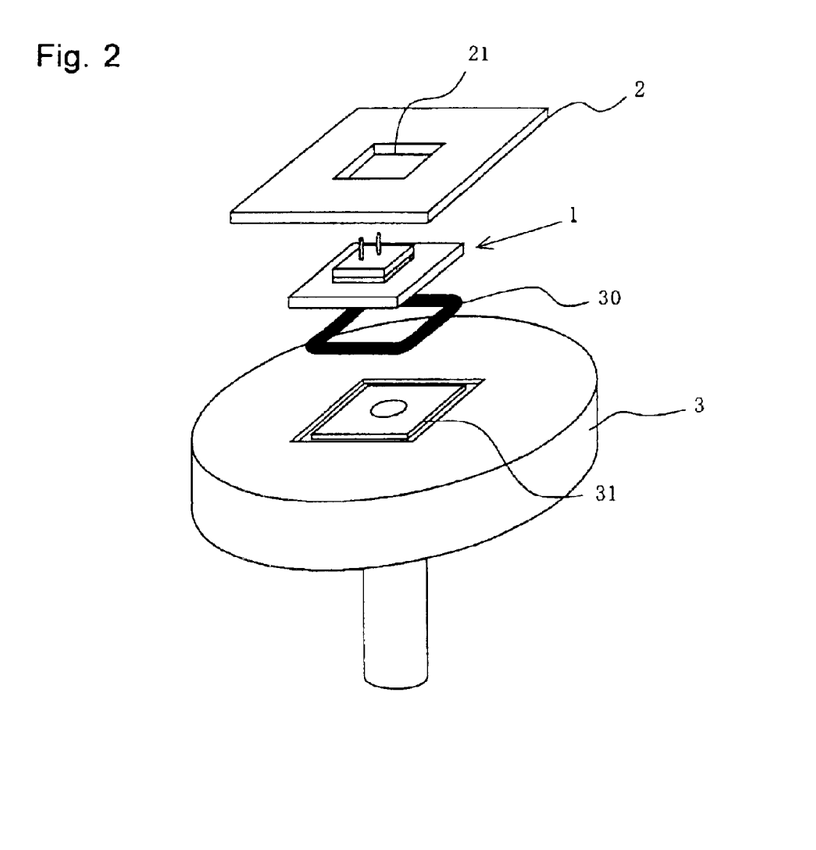
FIG. 2 is an exploded view of the pressure sensor shown in FIG. 1.

FIG. 1 is a schematic sectional view explaining one example of the capacitive pressure sensor on this invention, and FIG. 2 is an exploded view of the sensor.

As shown in the drawings, the pressure sensor chip of this embodiment is composed of three substrates, that is, a glass substrate 10 with a fixed electrode 13 (first substrate), a silicon substrate (for example, boron-doped silicon) 11 with a diaphragm (electrode) 15 of which thickness is several microns to dozens of microns (second substrate) and a glass substrate 12 with a pressure inlet 18 (third substrate). The multi-structure is formed by bonding these three substrates. The glass substrate 12 is larger than both the glass substrate 10 and the silicon substrate 11, and the peripheral region of glass substrate 12 is protruded from the endfaces of other substrates 10, 11.

The electrical signal of the fixed electrode 13 is taken out through lead wire 14 which runs through glass substrate 10, and the signal of diaphragm electrode 15 is taken out through lead wire 14' which is connected to the silicon substrate 11.

The sealed (vacuum) chamber 16 is formed between the glass substrate 10 and the silicon substrate 11, and the inside of it is always maintained at low pressure by a non-evaporable getter 17 which absorbs residual gas. If there is pressure difference between space 4 to be measured and the sealed chamber 16, the diaphragm 15 deflects depending on. the magnitude of pressure difference, and results in the change in the electrostatic capacitance between the fixed electrode 13 and the diaphragm electrode 15. Therefore, the pressure of the space 4 can be obtained from the measured values of electrostatic capacitance and the relationship between pressure and electrostatic capacitance.

Furthermore, the methods for forming diaphragm and bonding substrates are described in, for example, JP2002-43585A.

Next, the method for mounting the sensor chip 1 onto the base adaptor 3 is explained below.

A groove 31 is formed on the base adaptor 3 to insert O-ring therein. The depth of the groove is determined so that the O-ring 31 inserted therein will be in contact with the peripheral region of glass substrate 12, i.e., the region which protrudes from the endfaces of the glass substrate 10 and the silicon substrate 11. Moreover, an aperture 21 is formed in the central portion of the press plate 2 so that the glass substrate 10 and the silicon substrate 11 fit into the aperture 21, when the sensor chip 1 is mounted onto the base adaptor 3 with the press plate 2.

With such a configuration, the force is not exerted onto the silicon substrate 11, but only onto the glass substrate 12, even when the sensor chip 1 is pressed with a strong force to secure the vacuum seal or when the screw was tightened nonuniformly. Consequently, the sensor chip 1 is securely mounted onto the base adaptor 3 without strain on the diaphragm 15. As a result, the electrostatic capacitance is obtained as is designed, this makes it possible to carry out accurate measurements.

Then, it has been analyzed how the sensor chips shown in FIGS. 1 and 8 are deformed by the stress which relates to O-ring. This analysis was carried out by calculating the degree of deformation when the force of 24N, at which the O-ring becomes compressed. 20%, is applied to the contact surface between the O-ring and the sensor chip.

The substrates 10 and 11 are 11.6×11.6×0.4 mm and 11.6×11.6×0.8 mm, respectively. The diaphragm is 4.2×4.2 mm ×7 μm. The substrates 12 of the sensors shown in FIGS. 1 and 8 are 20×20×2.0 mm and 11.6×11.6×2.0 mm, respectively. As the materials for the sensor chip, Pyrex 7740 glass (Corning) was used for the substrates 10 and 12, and p-type silicon substrate was used for the substrate 11 with a diaphragm electrode. The characteristics of the materials are shown in Table 1.

TABLE 1

| Material | Pyrex glass | p-type silicon |
|---|---|---|
| Elastic modulus (GPa) | 64 | 162 |
| Poisson ratio | 0.2 | 0.22 |
| Shear coefficient (GPa) | 26.18 | 0.7 |

Figure 3:
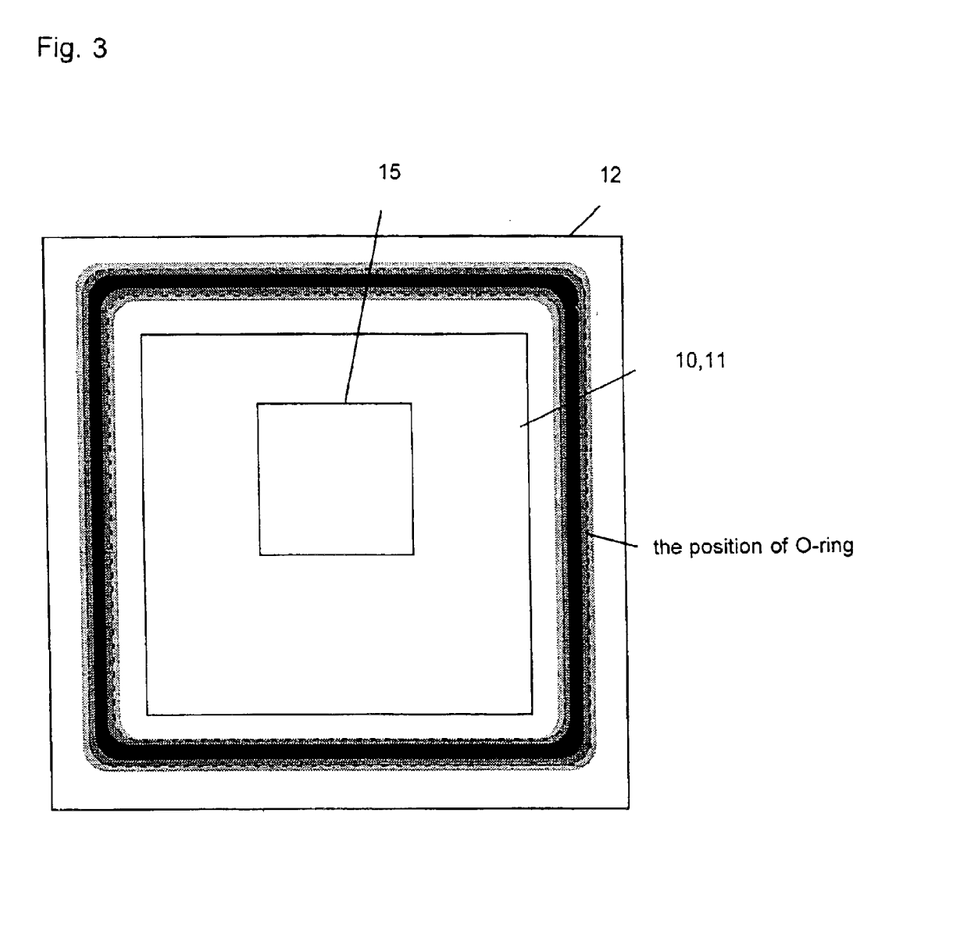
FIG. 3 is a schematic diagram showing the stress distribution exerted on the diaphragm and the like of the pressure sensor shown in FIG. 1.
Figure 4:
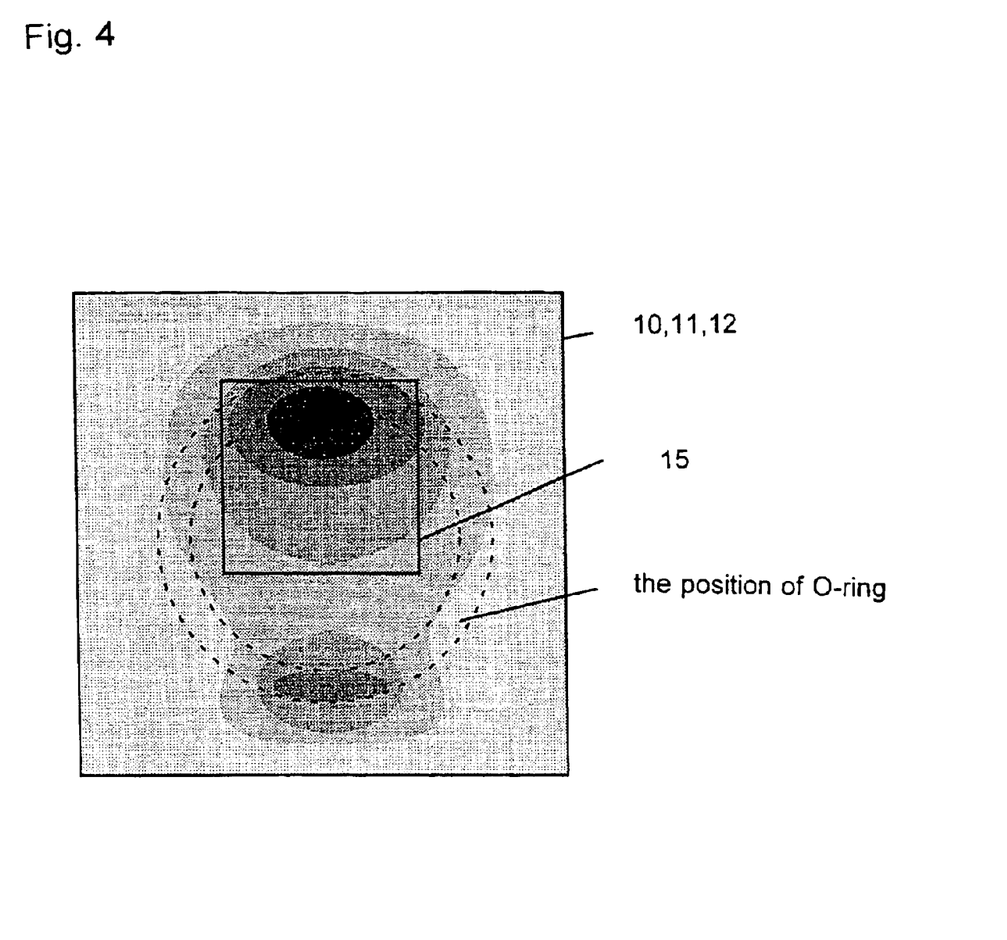
FIG. 4 is a schematic diagram showing the stress distribution exerted on the diaphragm and the like of the pressure sensor shown in FIG. 8.

The analytical results on the sensors shown in FIGS. 1 and 8 are shown in FIGS. 3 and 4, respectively. In the drawings, the black region (the darkest region) and the white region (the brightest region) show the regions where the degree of displacement are $7 \times 10^{-13}$ m or more and $3.5 \times 10^{-13}$ m or less, respectively. The gray parts show the region where the degree of displacement is intermediate between them. In other words, the degree of displacement increases with the darkness in FIGS. 3 and 4.

As is apparent from these two figures, only a limited part of the glass substrate 12, which is in contact with O-ring 30, suffers from the stress, and the rest is free from any stresses in the sensor chip 1 of this embodiment, while the diaphragm of the conventional sensor configuration (FIG. 8) suffers from a large amount of stress which would result in diaphragm deformation. That is, even if the sensor chip 1 is pressed down by the press plate 2 with rather strong force in order to secure the vacuum seal, the diaphragm 15 of the silicon substrate 11 does not become deformed, and this makes it possible to measure pressure with accuracy and reproducibility.

(Embodiment 2)

Figure 5:
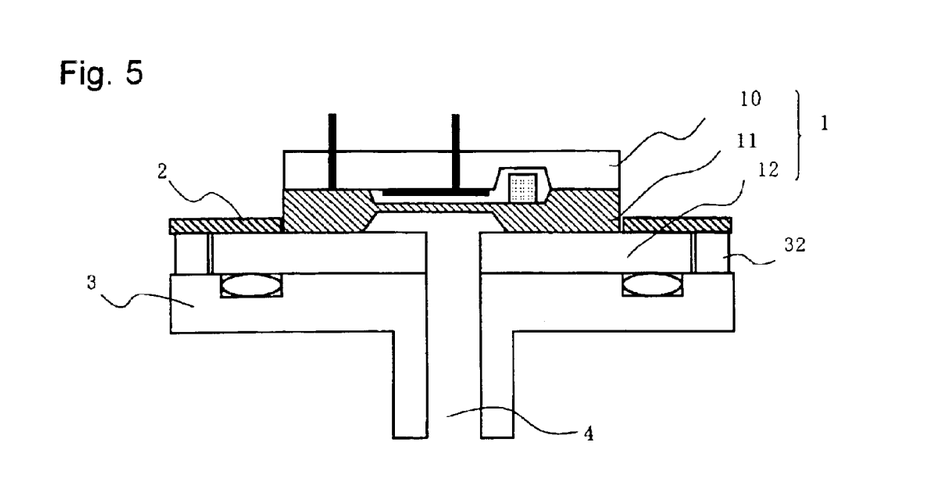
FIG. 5 is a schematic sectional view showing a capacitive pressure sensor of Embodiment 2.

Next, another example of the present invention is shown in FIG. 5.

FIG. 5 is a sectional view of a pressure sensor where a guide member 32 is equipped around the sensor chip 1. By the equipment of the guide member 32, excessive force is not exerted onto the glass substrate 12, and it helps to avoid the destruction of the glass substrate and makes the mounting operation easy and safe.

(Embodiment 3)

As mentioned above, the pressure sensors of Embodiments 1 and 2 reduce the strain of the sensor chip which is attributed to the mounting condition, and therefore can suppress the variation and the scatter in the electrostatic capacitance. In contrast, it was found that the output signal from these sensor chips changes with the ambient temperature although the degree of change itself is very small as compared with the conventional sensors. From the experimental investigation, it was also found that temperature dependence of electrostatic capacitance increases with the deviation from the designed capacitance when the sensor chip is mounted on the base adaptor.

This may be explained as follows. Since the press plate and the base adaptor are usually made of stainless steel whose thermal expansion coefficient is larger than those of silicon and Pyrex glass, it is likely that when the sensor chip is directly pressed and fixed by the press plate, the difference in thermal expansion may cause the strain between them and then the change in electrostatic capacitance. Furthermore, if the strain is large by some reason when the sensor chip is mounted on the base adaptor, the temperature dependence of electrostatic capacitance increases.

Then, a variety of sensor configurations were examined in order to decrease the strain induced by mounting the sensor chip. Thus, a pressure sensor with a small temperature dependence of output signal has been invented. An embodiment of it is shown in FIG. 6.

Figure 6:
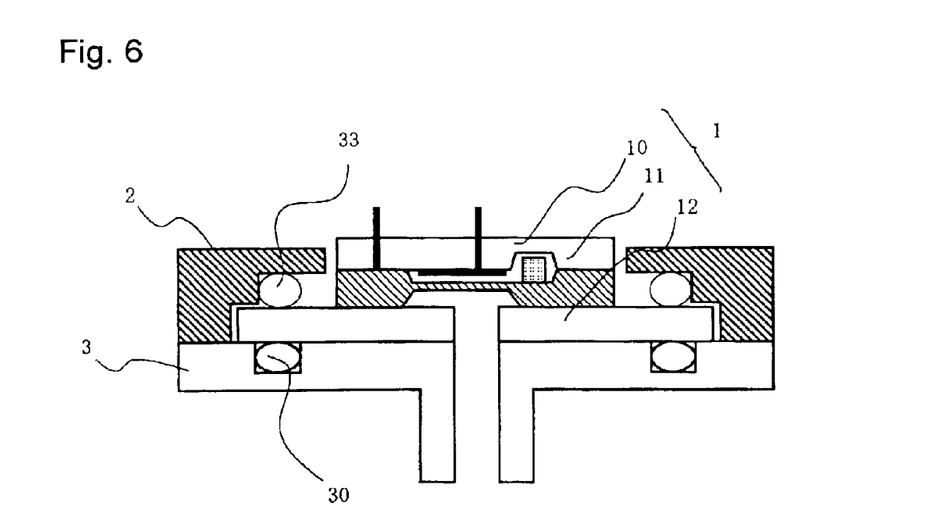
FIG. 6 is a schematic sectional view showing a capacitive pressure sensor of Embodiment 3.

The pressure sensor of this embodiment shown in FIG. 6 has nearly the same configuration as the pressure sensor of Embodiment 1, except that an O-ring (a buffer member) is placed between the glass substrate 12 and the press plate 2.

Figure 7:
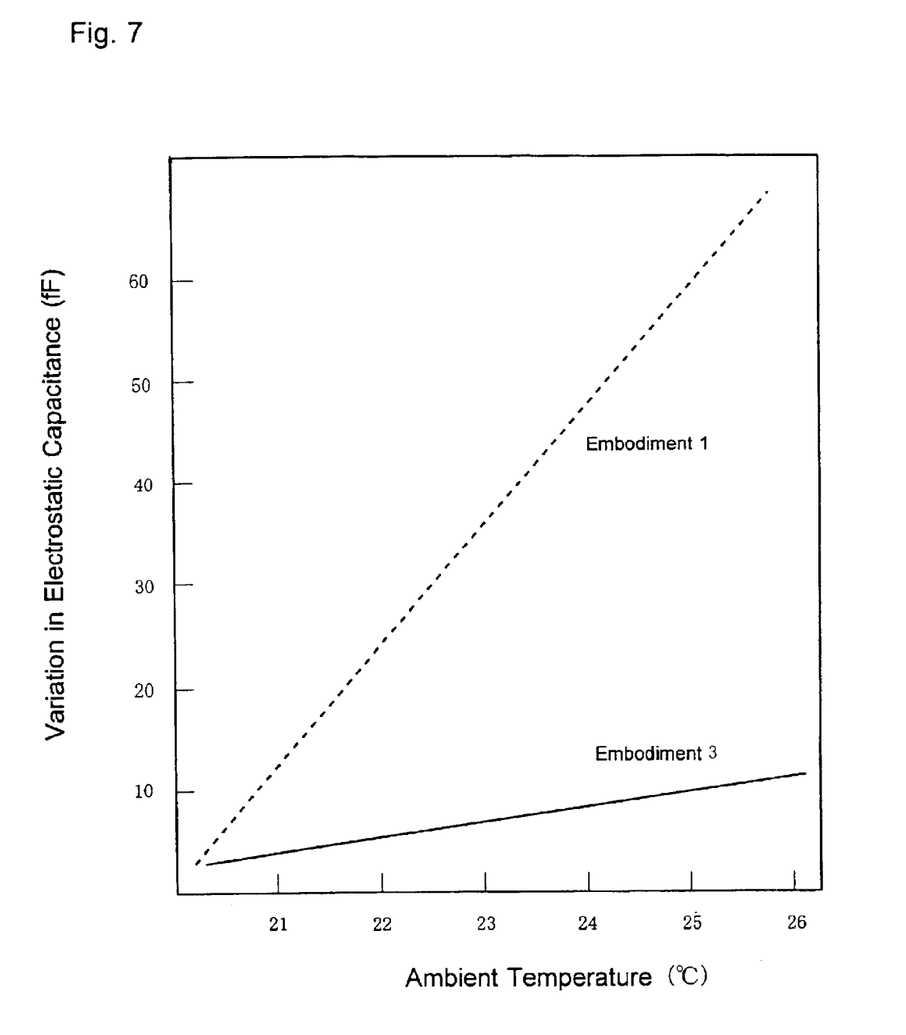
FIG. 7 is a graph showing the relationship between the variation of electrostatic capacitance and the ambient temperature.

The pressure sensors of this embodiment and Embodiment 1 were installed onto a vacuum chamber to evaluate the temperature dependence of electrostatic capacitance. The typical characteristics of them are shown in FIG. 7. Here, the ordinate denotes the variation in the electrostatic capacitance against the ambient temperature under a constant pressure.

As is apparent from FIG. 7, the variation in the electrostatic capacitance can be drastically reduced by applying the sensor configuration of this embodiment. Moreover, although not shown in FIG. 7, it was also found that the temperature dependence of electrostatic capacitance (i.e., the inclination of the graph) increases and scatters in the wide range of 10–30 fF/° C. depending on the condition of screw tightening in the case of Embodiment 1, while the temperature dependence of electrostatic capacitance decreases to 1–2 fF/° C. and its scatter is hardly observed in embodiment 3.

The same O-rings are used for both the buffer member 33 and the sealing member 30 in this embodiment. However, any material or shape can be employed as the buffer member so long as it may reduce the strain of the third substrate caused by the difference in thermal expansion between the press plate and the third substrate. Therefore, in addition to elastic materials such as rubber, even rigid materials such as fluorine-contained resins may be employed so long as they have a small friction coefficient.

Moreover, the buffer member may be placed in fragments between the glass substrate and the press plate. However, the buffer member which has the same shape and material as the sealing member is preferably placed at the symmetrical position on the opposite surface of the glass substrate to the sealing member. This configuration makes it possible to realize a pressure sensor which has less strain and less variation in output signal. In addition, the groove for O-ring may be formed on the press plate in the same shape as that on the base adaptor.

As has been mentioned, the substrate with a pressure inlet which is larger than the substrate with a fixed electrode and the substrate with a diaphragm electrode is employed to protrude the peripheral region from the two substrates. Then, a sealing member such as O-ring is placed on the protruded peripheral region to secure vacuum seal, and only the region for sealing with O-ring is pressed by a press plate. Thus, unexpected stress can be prevented from exerting onto the silicon substrate which is a critical member for pressure measurement, and this makes it possible to measure pressure with accuracy and reproducibility.

Furthermore, the substrate strain due to the difference in thermal expansions is reduced by placing the buffer member between the press plate and the glass substrate, which makes it possible to carry out reliable, accurate pressure measurements even in the case where the temperature around the sensor chip changes.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A capacitive pressure sensor comprising a capacitive pressure sensor chip mounted on a base adaptor so as to be detachable with the intervention of a sealing member, said sensor chip being constructed in a manner that a second substrate with a diaphragm electrode is placed between a first substrate with a fixed electrode and a third substrate with a pressure inlet and is bonded to said first and said third substrate so as to overlap said fixed electrode, said diaphragm electrode and said pressure inlet with a prescribed gap between the fixed electrode and the diaphragm electrode, wherein said third substrate is larger than said second substrate to make a place which extends beyond said second substrate and forms a sealing surface to be in contact with said sealing member, and said sealing surface is pressed to said base adaptor with the intervention of said sealing member.

2. The capacitive pressure sensor according to claim 1, wherein said place of the third substrate is pressed from the surface opposite to said sealing surface by a press plate.

3. The capacitive pressure sensor according to claim 2, wherein a guide member is placed to keep a gap between said press plate and said base adaptor larger than a prescribed value.

4. The capacitive pressure sensor according to claim 3, wherein a buffer member is placed between said press plate and said third substrate.

5. The capacitive pressure sensor according to claim 4, wherein said buffer member and said sealing member comprises an O-ring.

6. The capacitive pressure sensor according to claim 5, wherein the region of said third substrate which is in contact with said buffer member and the region which is in contact with said sealing member are symmetrical each other with respect to said third substrate.

7. The capacitive pressure sensor according to claim 4, wherein the region of said third substrate which is in contact with said buffer member and the region which is in contact with said sealing member are symmetrical each other with respect to said third substrate.

8. The capacitive pressure sensor according to claim 2, wherein a buffer member is placed between said press plate and said third substrate.

9. The capacitive pressure sensor according to claim 8, wherein said buffer member and said sealing member comprises an O-ring.

10. The capacitive pressure sensor according to claim 9, wherein the region of said third substrate which is in contact with said buffer member and the region which is in contact with said sealing member are symmetrical each other with respect to said third substrate.

11. The capacitive pressure sensor according to claim 8, wherein the region of said third substrate which is in contact with said buffer member and the region which is in contact with said sealing member are symmetrical each other with respect to said third substrate.

12. The capacitive pressure sensor according to claim 1, further comprising a gap between the diaphragm electrode and the third substrate.

* * * * *